United States Patent
Nagata

(10) Patent No.: US 8,291,311 B2
(45) Date of Patent: Oct. 16, 2012

(54) WEB DISPLAY PROGRAM CONVERSION SYSTEM, WEB DISPLAY PROGRAM CONVERSION METHOD AND PROGRAM FOR CONVERTING WEB DISPLAY PROGRAM

(75) Inventor: Toyoshi Nagata, Tokyo (JP)

(73) Assignee: Showcase-TV Inc., Tokyo (JP)

( * ) Notice: Subject to any disclaimer, the term of this patent is extended or adjusted under 35 U.S.C. 154(b) by 0 days.

(21) Appl. No.: 13/381,038

(22) PCT Filed: Jul. 20, 2011

(86) PCT No.: PCT/JP2011/066446
§ 371 (c)(1),
(2), (4) Date: Dec. 27, 2011

(65) Prior Publication Data
US 2012/0233536 A1    Sep. 13, 2012

(30) Foreign Application Priority Data
Mar. 7, 2011    (JP) .................................. 2011-049409

(51) Int. Cl.
*G06F 17/00*    (2006.01)

(52) U.S. Cl. ........ 715/234; 715/200; 715/209; 715/235; 715/238; 715/251; 715/252; 715/255; 715/760

(58) Field of Classification Search .................. 715/200, 715/209, 234, 235, 238, 251, 252, 255, 760
See application file for complete search history.

(56) References Cited

U.S. PATENT DOCUMENTS

| | | | | |
|---|---|---|---|---|
| 5,911,776 | A | * | 6/1999 | Guck ............................. 709/217 |
| 6,055,522 | A | * | 4/2000 | Krishna et al. ................ 715/205 |
| 6,055,544 | A | * | 4/2000 | DeRose et al. ........................ 1/1 |
| 6,610,104 | B1 | * | 8/2003 | Lin et al. ........................ 715/235 |
| 6,792,577 | B1 | * | 9/2004 | Kimoto .......................... 715/235 |
| 6,928,617 | B2 | * | 8/2005 | Druyan et al. ................. 715/760 |
| 6,964,013 | B1 | * | 11/2005 | Ono et al. ...................... 715/207 |
| 7,210,100 | B2 | * | 4/2007 | Berger et al. .................. 715/229 |

(Continued)

FOREIGN PATENT DOCUMENTS
EP         1647906           4/2006
(Continued)

OTHER PUBLICATIONS

Cai et al, "VIPS: a Vision-based Page Segmentation Algorithm", Microsoft, Nov. 1, 2003, 29 pgs.*

(Continued)

*Primary Examiner* — Cesar Paula
*Assistant Examiner* — David Faber
(74) *Attorney, Agent, or Firm* — Staas & Halsey LLP

(57) ABSTRACT

A system which converts a first Web display program designed for a first communication terminal apparatus to a second Web display program for a second communication terminal apparatus. The system of the present invention stores a segment list created by dividing the first Web display program into segments, assigning identification information to tags contained in the segments, and listing the identification information, stores a conversion condition created for the segments for changing a display setting described in the first Web display program to a display setting of the second Web display program, and stores a conversion program for causing a conversion process for converting the first Web display program to the second Web display program to be executed using he segment list and the conversion condition. According to a preferred embodiment of the present invention, the conversion process is executed by the second communication terminal apparatus.

12 Claims, 13 Drawing Sheets

U.S. PATENT DOCUMENTS

| | | | |
|---|---|---|---|
| 7,370,036 B2* | 5/2008 | Vedula | 707/770 |
| 7,458,102 B2* | 11/2008 | Rogers et al. | 726/30 |
| 7,904,805 B2* | 3/2011 | Sequeira | 715/234 |
| 7,937,386 B2* | 5/2011 | Barrett et al. | 707/713 |
| 7,987,417 B2* | 7/2011 | Chakrabarti et al. | 715/205 |
| 8,001,464 B1* | 8/2011 | Goel et al. | 715/234 |
| 2002/0010715 A1* | 1/2002 | Chinn et al. | 707/514 |
| 2003/0093565 A1* | 5/2003 | Berger et al. | 709/246 |
| 2004/0044963 A1* | 3/2004 | Uchiyama et al. | 715/513 |
| 2004/0237044 A1* | 11/2004 | Travieso et al. | 715/530 |
| 2005/0066269 A1* | 3/2005 | Wang et al. | 715/513 |
| 2006/0085743 A1* | 4/2006 | Baudisch et al. | 715/526 |
| 2006/0173815 A1* | 8/2006 | Vedula | 707/3 |
| 2006/0282758 A1* | 12/2006 | Simons et al. | 715/500 |
| 2007/0124416 A1* | 5/2007 | Casey et al. | 709/217 |
| 2008/0086692 A1* | 4/2008 | Berstis et al. | 715/736 |
| 2008/0201452 A1* | 8/2008 | Athas et al. | 709/219 |
| 2009/0049375 A1* | 2/2009 | Aughenbaugh et al. | 715/253 |
| 2009/0083612 A1* | 3/2009 | Baker | 715/200 |
| 2009/0290189 A1* | 11/2009 | Izu et al. | 358/1.15 |
| 2010/0185594 A1* | 7/2010 | Brannon, III et al. | 707/695 |
| 2010/0257440 A1* | 10/2010 | Kshirsagar et al. | 715/230 |
| 2011/0173188 A1* | 7/2011 | Walsh et al. | 707/722 |
| 2011/0296291 A1* | 12/2011 | Melkinov et al. | 715/229 |
| 2012/0005429 A1* | 1/2012 | Kalasapur et al. | 711/118 |
| 2012/0005686 A1* | 1/2012 | Rajan et al. | 718/105 |
| 2012/0110427 A1* | 5/2012 | Krause | 715/208 |

FOREIGN PATENT DOCUMENTS

| | | |
|---|---|---|
| JP | 2003-271508 | 9/2003 |
| JP | 2005-322177 | 11/2005 |
| JP | 2006-120153 | 5/2006 |
| JP | 2006-243829 | 9/2006 |

OTHER PUBLICATIONS

Bjork et al, "WEST: A Web Browser for Small Terminals", UIST '99, 1999, 10 pages.*

PCT Written Opinion of International Search Authority (ISA) (PCT/ISA/237) issued Sep. 20, 2011 in corresponding international application No. PCT/JP2011/066446 (3 pages) (2 pages English Translation), 5 Pages Total.

* cited by examiner

WEB DISPLAY PROGRAM CONVERSION SYSTEM, WEB DISPLAY PROGRAM CONVERSION METHOD AND PROGRAM FOR CONVERTING WEB DISPLAY PROGRAM

CROSS REFERENCE TO RELATED APPLICATIONS

This application is based on and hereby claims priority to International Application No. PCT/JP2011/066446 filed on Jul. 20, 2011 and Japanese Application No. 2011-049409 filed on Mar. 7, 2011, the contents of which are hereby incorporated by reference in their entireties.

TECHNICAL FIELD

The present invention relates to a system, method and program that convert a Web display program and, in particular, to a conversion system, conversion method and conversion program for converting a Web display program specifically designed for a given apparatus to a display program for another apparatus.

BACKGROUND ART

Smartphones, which are personal digital assistants with mobile phone capabilities, are becoming widespread. In addition to mobile phone capabilities, smartphones have multiple capabilities, including Web browsing and executing application programs, packed in highly portable, small hardware. Conventional mobile phones have allowed Web browsing and have been capable of executing application programs. These functions of the mobile phones are similar to functions executed on general-purpose personal computers (PCs) connected to another PC or a server computer through the Internet. However, ordinary mobile phones are unable to directly obtain services made available to PCs. That is, these functions of mobile phones are implemented by obtaining services specifically designed for mobile phones and provided by mobile phone carriers.

Smartphones, on the other hand, allow browsing of Web sites constructed for PCs through direct connection to the Internet. That is, while mobile phones access sites for mobile phones provided by mobile phone carriers to browse information written in an HTML (Hyper Text Markup Language) specifically designed for mobile phones, smartphones allow direct browsing of HTML pages designed for PCs. Accordingly, Web site providers do not need to construct specialized Web pages for smartphones, which are required for mobile phones. For Web sites for mobile phones, various techniques that facilitate construction of Web pages that fit to devices having small displays, such as mobile phones have been proposed (for example see Japanese Patent Application Laid-Open No. 2010-288243). Although construction of Web pages for mobile phones has become easier, separate Web pages for mobile phones need to be constructed independently of Web sites for PCs and therefore need to be maintained and managed separately from Web sites for PCs. Therefore, not many Web site providers are operating both of sites for PCs and sites for mobile phones.

On the other hand, smartphones allows browsing of PC Web sites without adaptations and therefore Web pages do not need to be written in an HTML specifically designed for smartphones. In this respect, smartphones have an advantage over mobile phones as mobile information devices. However, smartphones have shortcomings such as small screen sizes and difficulties in inputting characters and other data, like mobile phones. Thus, smartphones are not necessarily satisfactory in the ease of browsing and operation.

Therefore there are Web site operators that construct Web sites that fit smartphones on the basis of Web pages designed for PCs. For example, parts of a Web page designed for PCs that are irrelevant can be reduced in size or deleted to fit the page to the display size of smartphones, thereby constructing a Web page more usable to the users of smartphones.

The way of displaying a Web page can be changed by modifying a file called CSS (Cascading Style Sheets) which acts on HTML tags and defines the appearance of Web pages. For example, information written in HTML that contains a tag <TABLE>, which defines a table, can be displayed in a format that fit the display of a smartphone to some extent by setting <WIDTH>, which is a property defining the width of a table, to 50%.

SUMMARY OF THE INVENTION

Problems to be Solved by the Invention

However, the problem with the mobile phone sites described above also arises when Web sites for smartphones are constructed from Web pages designed for PCs. That is, there is not much difference between creating a site for smartphones in the way described above and constructing a site for mobile phones separately from a site designed for PCs. In other word, there is a problem that sites for smartphones need to be maintained and managed separately from sites for PCs and updating of PC sites and updating of smartphone sites cannot be unified.

Furthermore, when CSS described above is used, only one rule can be specified to convert a Web page designed for PCs to a Web page for smartphones. Accordingly, different elements of each page cannot differently be displayed and therefore the visibility of the pages cannot satisfactorily be improved.

The present invention has been made in light of these problems with the conventional techniques and an object of the present invention is to automatically convert a Web display program developed for ordinary apparatuses to a Web display program appropriate for viewing on apparatuses of another specific type by using a specified condition and to provide the Web display program converted appropriately for the specific apparatus without specifically constructing and managing a Web page for apparatuses of the specific type.

Means for Solving the Problem

A Web display program conversion system according to a first aspect of the present invention includes a conversion information server apparatus connected to a communication network, wherein the conversion information server includes: a first storage which stores a segment list created by dividing a first Web display program created for causing a first communication terminal apparatus to present a Web display into a plurality of segments, assigning identification information to each of tags contained in each of the segments, and listing the identification information; a second storage which stores a conversion condition created for each of the segments for changing a display setting described in the first Web display program to a display setting of a second Web display program for causing a second communication terminal apparatus to present a Web display; third storage which stores a conversion program for causing the second communication apparatus to execute a process for converting the first Web display program to the second Web display program by using the segment list and the conversion condition; and a transmitting unit which sends the segment list, the conversion condition, and the conversion program to the communication network.

The Web display program conversion system in the first aspect of the present invention preferably further includes a display information server apparatus connected to the communication network and the display information server apparatus preferably stores the first Web display program and sends the first Web display program in response to a request from any of the first and second communication terminal apparatuses.

In the first aspect of the present invention, the conversion information display server apparatus preferably further includes a fourth storage which stores an initial setting program to be executed on any of the first and second communication terminal apparatuses, and the initial setting program is preferably a program that determines whether a communication terminal apparatus is the first communication terminal apparatus or the second communication terminal apparatus and, only if the communication terminal apparatus is the second communication terminal apparatus, causes the conversion process to be executed.

In the first aspect of the present invention, the first Web display program sent from the information transmitting unit of the display information server apparatus preferably includes a tag for causing any of the first and second communication terminal apparatuses to access the conversion information display server apparatus to obtain the initial setting program.

In the first aspect of the present invention, the initial setting program is preferably sent from the transmitting unit to any of the first and second communication terminal apparatuses together with the segment list, the conversion condition, and the conversion program.

In the first aspect of the present invention, the segment list, the conversion condition and the conversion program are preferably sent from the sending unit to the second communication terminal apparatus only if the initial setting program determines that the communication terminal apparatus is the second communication terminal apparatus.

In the first aspect of the present invention, the conversion information server apparatus preferably stores the first Web display program and, in response to a request from any of the first and second communication terminal apparatuses, sends the first Web display program.

In the first aspect of the present invention, the conversion information server apparatus preferably further stores an initial setting program to be executed on any of the first and second communication terminal apparatuses, and the initial setting program is preferably a program that determines whether a communication terminal apparatus is the first communication terminal apparatus or the second communication terminal apparatus and, only if the communication terminal apparatus is the second communication terminal apparatus, causes the conversion process to be executed.

In the first aspect of the present invention, the first Web display program sent from the information transmitting unit of the conversion information server apparatus preferably includes a tag for causing any of the first and second communication terminal apparatuses to access the display information server apparatus to obtain the initial setting program.

In the first aspect of the present invention, the initial setting program is preferably sent from the transmitting unit to any of the first and second communication terminal apparatuses together with the segment list, the conversion condition, and the conversion program.

In the first aspect of the present invention, the segment list, the conversion condition and the conversion program are preferably sent from the display information server apparatus to the second communication terminal apparatus only if the initial setting program determines that the communication terminal apparatus is the second communication terminal apparatus.

In the first aspect of the present invention, the conversion information server apparatus preferably stores the first Web display program and, in response to a request from the second communication terminal apparatuses of a predetermined type, sends the first Web display program.

A Web display program conversion method according to a second aspect of the present invention includes the steps of: creating a segment list by dividing a first Web display program created for causing a first communication terminal apparatus to present a Web display into a plurality of segments, assigning identification information to each of tags contained in each of the segments, and listing the identification information; creating, for each of the segments, a conversion condition for changing a display setting described in the first Web display program to a display setting of a second Web display program for causing a second communication terminal apparatus to present a Web display; and causing the second communication terminal apparatus to execute a process for converting the first Web display program to the second Web display program by using to use the segment list and the conversion condition.

A Web display program conversion program according to a third aspect of the present invention cause a computer to execute the steps of: creating a segment list by dividing a first Web display program created for causing a first communication terminal apparatus to present a Web display into a plurality of segments, assigning identification information to each of tags contained in each of the segments, and listing the identification information; creating, for each of the segments, a conversion condition for changing a display setting described in the first Web display program to a display setting of a second Web display program for causing a second communication terminal apparatus to present a Web display; and causing the second communication terminal apparatus to execute a process for converting the first Web display program to the second Web display program by using the segment list and the conversion condition.

Advantageous Effect of Invention

According to the present invention, the first Web display program for causing the first communication terminal apparatus to present a Web display is divided into segments so that each of the segments can be specified on a segment list, and a conversion condition is specified for each of the segments. A conversion process using the segment list and the conversion condition is executed to create a second Web display program for causing the second communication terminal apparatus to present a Web display. Consequently, according to the present invention, the first Web display program can be converted to the second Web display program by a simple process.

Furthermore, when the first Web display program is updated, the second Web display program can be updated simply by making simple changes to the segment list and the conversion condition.

Moreover, since the system according to the present invention causes the second communication terminal apparatus to execute the conversion process, a display information server for the second communication terminal apparatus does not need to be operated.

DESCRIPTION OF EMBODIMENTS

Figure 1:
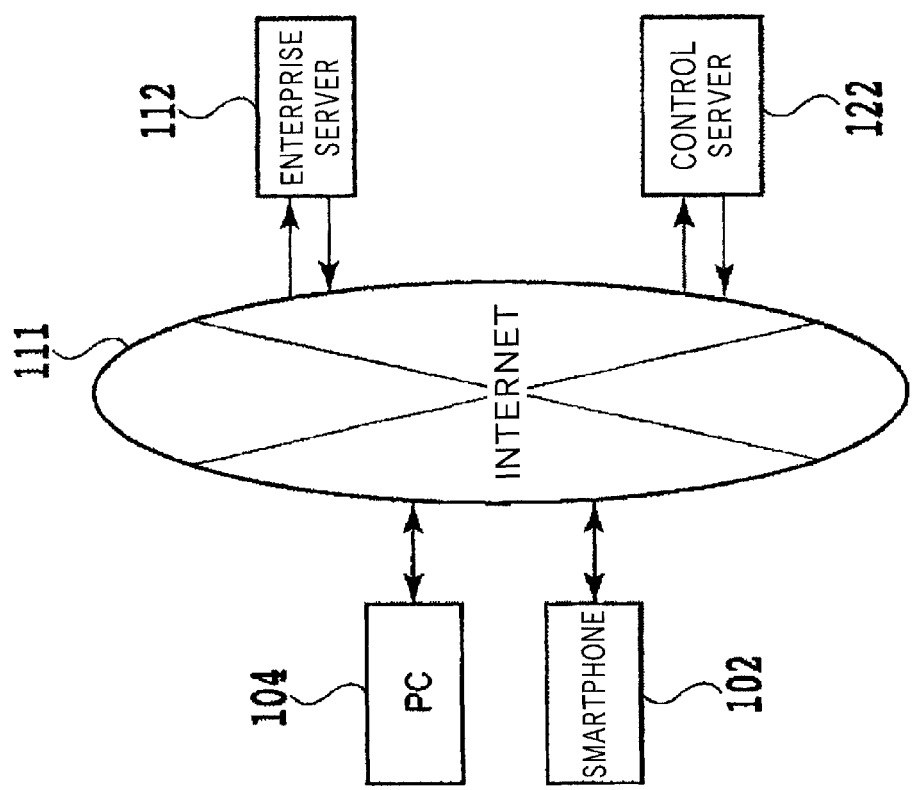
FIG. 1 is a diagram illustrating a system configuration of a first embodiment.

Embodiments of the present invention will be described below with reference to drawings.

First Embodiment of the Invention

A system of the first embodiment is designed to cause a mobile communication terminal to optimally execute a Web display program developed for personal computers (PCs). A mobile communication terminal relating to this embodiment has a different display size and user interface from those of a PC but has an internal configuration, including a CPU (Central Processing Unit), a communication interface and a memory, that is similar to that of the PC. The mobile communication terminal may be a smartphone or a mobile phone including Internet browsing capabilities. A Web display program relating to this embodiment is downloaded from a server or the like to a mobile communication terminal through a network such as the Internet and primarily executes a display process on the mobile communication terminal. The Web display program of this embodiment is typically, but not limited to, a program written in a markup language for the Internet, such as HTML.

When a program written in HTML is used to display data of a Web site designed for PCs, the amount of information displayed is typically very large. Accordingly, when the Web site designed for PCs is displayed on a mobile communication terminal, which has a smaller display than a PC, the whole display data is scaled down to significantly degrade the visibility of the data. The problem inevitably arises when the same screen that is designed to be displayed on the display of a PC is displayed on the smaller display of a mobile phone. To solve the problem, part of text information and images displayed on the display of a PC can simply be reduced in size or hidden. This allows the other text and image information to be displayed in an easily-viewable display size and thus a good viewing experience on the mobile communication terminal can be provided. Web pages designed for PCs in general contain text or other information that is irrelevant when viewed on a mobile communication terminal, text or other information that one does not want to display on a mobile communication terminal, text or other information that one wants to change in content or in layout. According to this embodiment, such text and other information is displayed in a reduced size or is hidden. Such Web display program conversion can be performed fully automatically. However, in order to make a Web page as optimum for mobile communication terminals as possible, it is desirable that a Web site provider individually adapt settings such as display/hide of display elements, the sizes of the display elements, the order in which the display elements are displayed, and combinations of the display elements.

Specifically, according to this embodiment, a display screen is divided into a plurality of segments beforehand and then the display size of content is reduced or content is hidden on a segment-by-segment basis. In this way, a Web display program developed for PCs is converted to a Web page display program for mobile communication terminals that provides a display style desired by the Web site provider. To achieve this, it is desirable that HTML, which is a markup language in which correspondence between display elements and program descriptions is relatively simple, be used. Therefore, HTML will be taken as an example of the markup language in the following description. However, any other markup language to which a principle of the present invention can be applied may be used.

(System Configuration of the Embodiment)

FIG. 1 is a conceptual diagram illustrating a system configuration of this embodiment. As illustrated in FIG. 1, the system includes a PC 104 functioning as a "first communication terminal apparatus", a mobile communication terminal (a smartphone in this example) 102 functioning as a "second communication terminal apparatus", an enterprise server 112 functioning as a "display information server", and a control server 122 functioning as a "conversion information server".

The PC 104 and the smartphone 102 are communicatively connected to the enterprise server 112 through a network (the Internet 111 in this example). The PC 104 and the smartphone 102 receive various programs written in HTML from the enterprise server 112 and execute the programs.

The enterprise server 112, which may be a WWW server, for example, provides information to be displayed on the PC 104 and the smartphone 102. The enterprise server 112 is operated and managed by a Web site provider.

The control server 122 is a server that performs processes specific to this embodiment and is communicatively connected to the PC 104 and the smartphone 102 through the Internet 111. The control server 122 is capable of sending and receiving data to and from the enterprise server 112 directly or through the Internet 111. The control server 122 is operated and managed by a provider, for example, that provides a service that converts a Web display program developed for PCs to a Web display program for mobile communication terminals.

Figure 2:
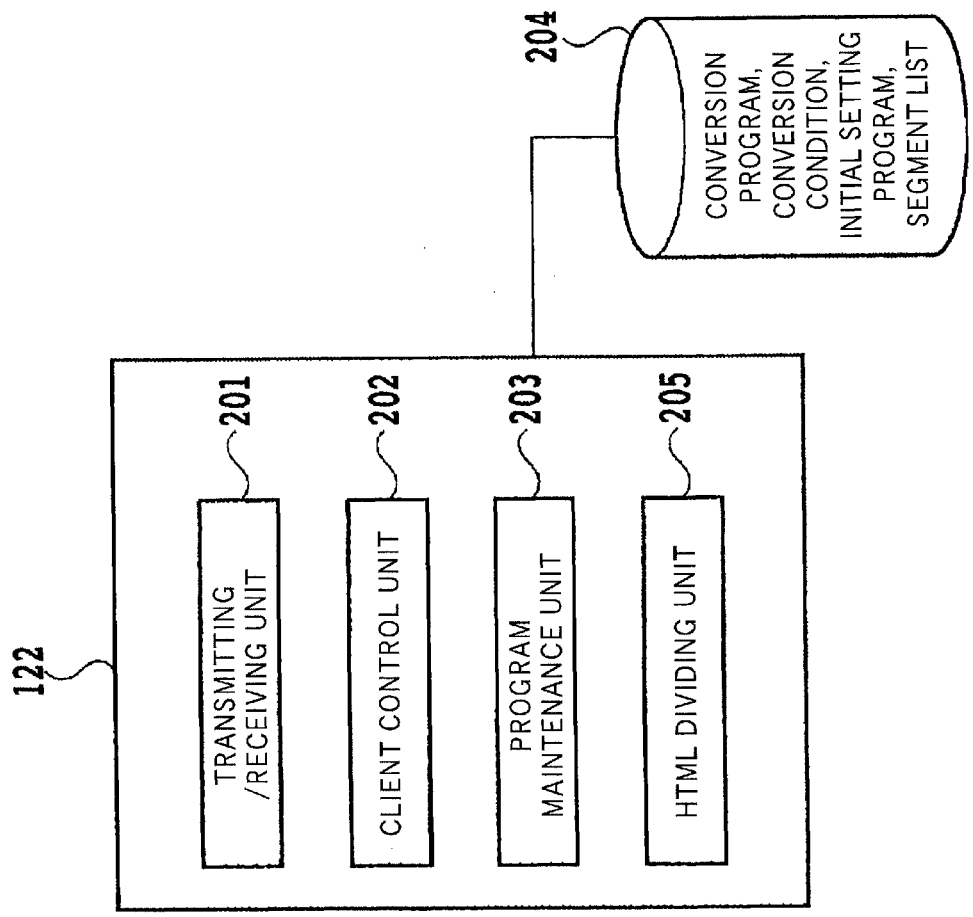
FIG. 2 is a functional block diagram of a control server according to the first embodiment.

FIG. 2 is a block diagram illustrating a functional module configuration of the control server 122 according to this embodiment. As illustrated in FIG. 2, the control server 122 includes a transmitting/receiving unit 201, a client control unit 202, a program maintenance unit 203, a storage 204, and an HTML dividing unit 205.

The transmitting/receiving unit 201 manages sending and receiving of data to and from the PC 104, the smartphone 102 and the enterprise server 112. As can be seen from FIG. 1 described above, the control server 122 is communicatively connected to the PC 104, the smartphone 102 and the enterprise server 112.

The HTML dividing unit 205 divides an HTML file into segments and generates a segment list (which will be describe later). A segment list is a list of pieces of identification information assigned to an HTML divided. The segment list is stored in the storage 204.

The storage 204 stores a conversion program, a conversion condition, and an initial setting program (which will be described later), in addition to the segment list. The storage 204 may be incorporated in the control server 122 or may be built as an external database.

The client control unit 202 manages the conversion program described above and data needed by the smartphone 102 to convert an HTML file segment-wise, such as the conversion condition and the segment list described above.

The program maintenance unit 203 executes a conversion condition setting tool (which will be described later) for setting a conversion condition. The program maintenance unit 203 also manages various kinds of related data and programs.

Figure 3:
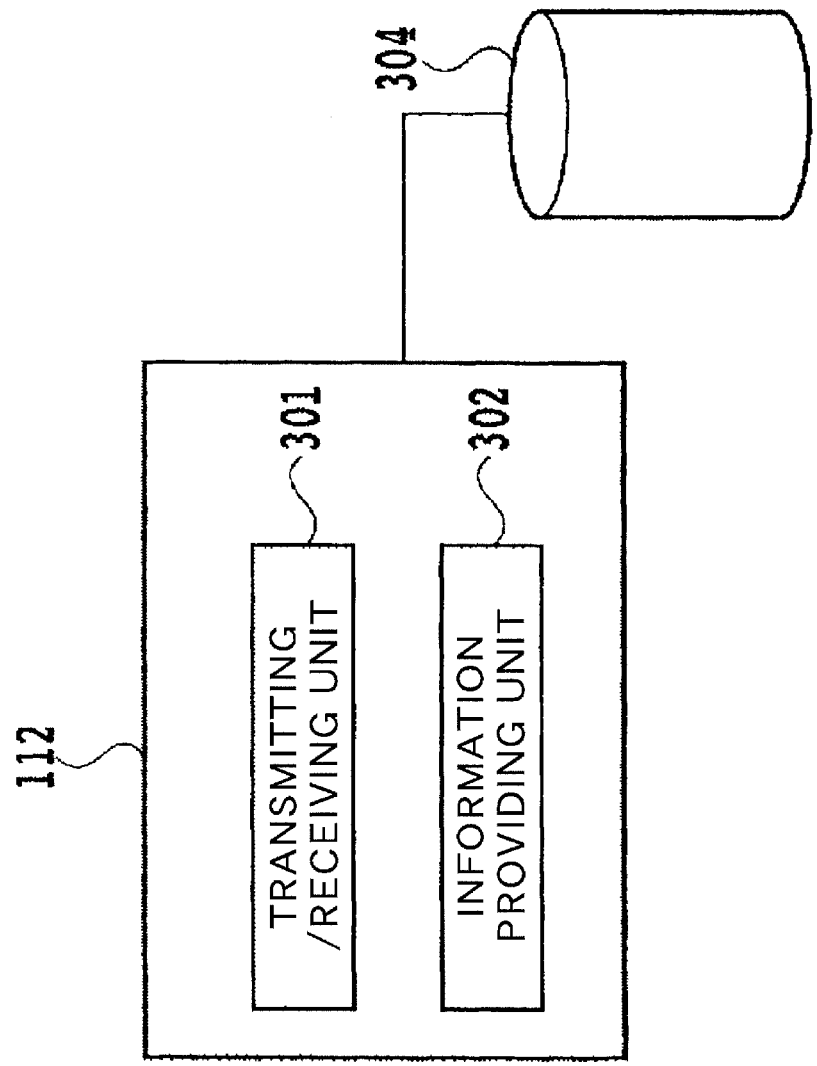
FIG. 3 is a functional block diagram of an enterprise server according to the first embodiment.

FIG. 3 is a block diagram illustrating a functional module configuration of the enterprise server 112 according to this embodiment. The enterprise server 112 includes a transmitting/receiving unit 301, an information providing unit 302, and a distribution information database 304.

The transmitting/receiving unit 301 manages sending and receiving of data to and from the PC 104, the smartphone 102 and the control server 122. As can be seen from FIG. 1 described above, the enterprise server 112 is communicatively connected to the PC 104, the smartphone 102 and the control server 122.

When a request for information is made from the smartphone 102 or the PC 104 to the enterprise server 112, the information providing unit 302 reads a file of a Web display program that corresponds to the request from the distribution information database 304 and sends the file to the smartphone 102 or the PC 104.

The distribution information database 304 stores a Web display program file and other data to be provided to the smartphone 102.

The smartphone 102 and the PC 104 interpret information provided from the enterprise server 112 and execute a process according to the result of the interpretation, as will, be described later. The Web display program provided to the smartphone 102 and the PC 104 in this embodiment can be a program similar to conventional ones, except that tags for causing the smartphone 102 and the PC 104 to connect to the control server 112 are added to the Web display program of this embodiment. That is, when web browsers on the smartphone 102 and the PC 104 interpret the Web display program, the web browsers connect to the control server 112.

(Principle of the Embodiment)

According to this embodiment, a Web display program developed for PCs 104 is converted to a Web display program for smartphones 102. The Principle of the conversion will be described below with reference to FIG. 7.

In this embodiment, a program developer at the enterprise server can change display of each of the elements of a page to be displayed by a Web display program at will. To enable this, according to this embodiment, an HTML file is divided into segments and identification information is associated with each of the segments in this embodiment as described below. Here, in order to identify a part of the page that corresponds to a segment to be changed on the HTML file, all of the tags contained in the HTML file before being changed may be encrypted. An example in which TABLE tags are used will be described below. It should be noted that the present invention can also be implemented using a programming language other than HTML and encryption is not essential.

Figure 7:
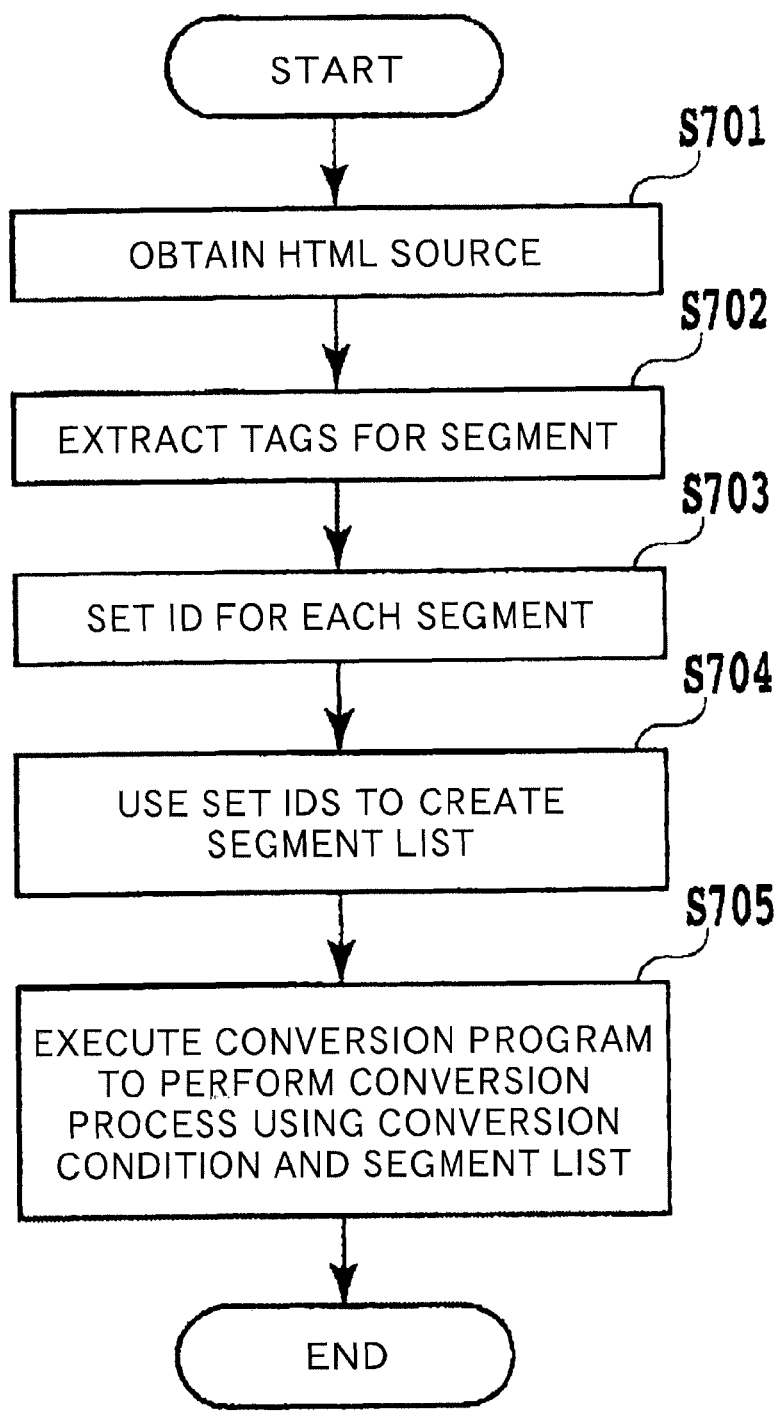
FIG. 7 is a flowchart illustrating an example of a process for dividing HTML and assigning identification information according to the first embodiment.
Figure 11:
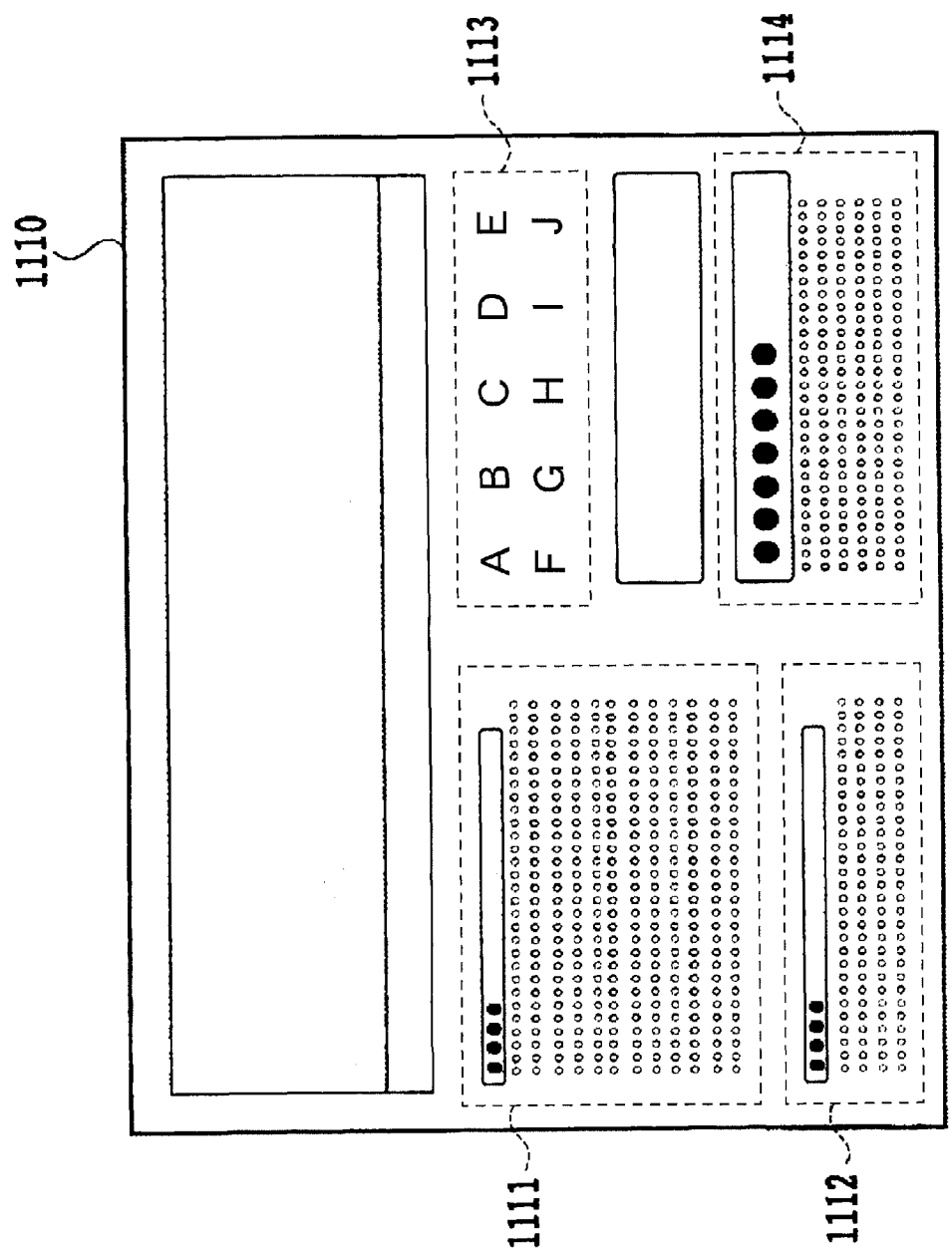
FIG. 11 is a conceptual diagram illustrating segments according to the first embodiment.

When designing a conversion condition file, the program developer first obtains an HTML source (see step S701 of FIG. 7). In this embodiment, a conversion process for changing the display of segment 1113 (specifically, the display of 'ABCDE' and 'FGHIJ') out of segments 1111, 1112, 1113 and 1114 contained in a screen 1110 designed for PCs illustrated in FIG. 11 will be described. The HTML source of segment 1113 is written as given below, for example.

<html>
<body>
<table>
<tr>
<td>ABCDE</td>
<td>FGHIJ</td>
</tr>
</table>
</body>
</html>

The program developer extracts tags corresponding to segment 1113 from the HTML source described above (see step S702). The program developer then assigns identification information 'body', 'table1', 'table1, tr1', 'table1, tr1, td1', and 'table1, tr1, td2' to the tags as shown below (see step S703).

| | |
|---|---|
| <body> | → body |
| <table> | → table1 |
| <tr> | → table1, tr1 |
| <td>ABCDE</td> | →table1, tr1, td1 |
| <td>FGHIJ</td> | → table1, tr1, td2 |
| </tr> | |
| </table> | |
| </body> | |

The program developer then creates a segment list indicating the relationship among the segment to be subjected to the conversion process (segment 1113 in this example), tags subjected to the conversion process, and identification information assigned to the tags (see step S704).

Once the program developer has performed the process for dividing the HTML file into segment and the process for assigning identification information to tags in this way, the program developer can identify any segment by using identification information and can change the display of the identified segment. In this embodiment, a management software (that is, the conversion condition setting tool), which will be described later, is used to create a conversion condition file. In the conversion condition file, changes to be made to the display of each segment are identified by the identification information. However, the system of the present invention may use a conversion condition file of form different from the one used in this embodiment.

The conversion condition and the segment list are sent from the control server 112 to the smartphone 102 together with a conversion program as will be described later. The conversion program on the smartphone 102 uses the conversion condition and the segment list to execute a predetermined conversion process (see step S705). Specifically, when the smartphone 102 uses a Web browser or the like to interpret the HTML file and present a display, the smartphone 102 first makes changes to the display according to the conversion condition and the segment list, then actually presents a display. The conversion program may be written in JavaScript (registered trademark), for example, or may be written in other programming language.

The process will be described more specifically by taking the HTML source described above as an example. For example, identification information 'table1, tr1, td2' has been assigned to the text element 'FGHIJ'. The identification information can be used to identify that the text element corresponds to the second td tag in the first tr tag in the first table tag. Here, a case will be described where the program developer wants to change the color of the border of the text element 'FGHIJ' to red on the smartphone 102 while keeping the other display conditions the same as those for PCs 104. In this case, a conversion condition including the identification information 'table1, tr1, td2' and attribute information for changing the border color to red is generated by the control server 112. In this embodiment, such process is executed by the conversion program using a segment list and a conversion condition. Therefore, in this embodiment, the HTML source does not need to be divided in order to change the display.

In addition to change of the border color of an element, other conversions can be performed such as change of the setting of display/hide of the display element, change of the display size, change of the display color, the display position of the display element, the order in which the characters in the display element are displayed, and replacement of the display element with another display element (such as a text or an image). Any of these conversions can be selectively performed on a desired display element by using identification information contained in the segment list described above. Consequently, the Web display program for PCs 104 can be readily converted to a Web display appropriate for the smartphone 102.

A Web display program is sometimes changed in order to update a content displayed and distribution information. However, the whole construction of a Web display is rarely changed. Therefore, when the Web display program is updated, conversion conditions and the segment list are less likely to need to be greatly changed. For example, if the character string 'FGHIJ' given above is changed to another character string and a conversion process is performed to change the color of the border of the new character string to red, the conversion condition and the segment list do not need to be changed. Furthermore, if a conversion condition and a segment list before an update cannot be used without change, a Web display program for smartphones 102 can be updated simply by changing the conversion condition and the segment list, according to this embodiment. The same applies to other changes such as change of setting of display/hide, change of the display size, change of the display color, display position of the display element, the order of display, and replacement with another display element.

(Specific Processes of the Embodiment)

The conversion process according to this embodiment includes the process for creating a segment list and a conversion condition on the basis of a Web display program and the process for using the created segment list and conversion condition to convert the Web display program as described above. These processes can be performed with various hardware environments and various software configurations. For example, after all of the processes have been executed on one server, the converted Web display program may be sent to the smartphone 102 to cause the smartphone 102 to present the converted display. Furthermore, the processes may be distributed over a plurality of servers and executed on the servers. In this embodiment, the control server 112 executes the process for generating a segment list and a conversion condition and the smartphone 102 executes the process for converting a Web display program. In this embodiment, an HTML source of a Web display program is divided into segments, a segment to be converted is identified on the segment list, and the conversion process is performed only on the identified segment. Accordingly, the load put on the smartphone 102 is small.

Figure 4:
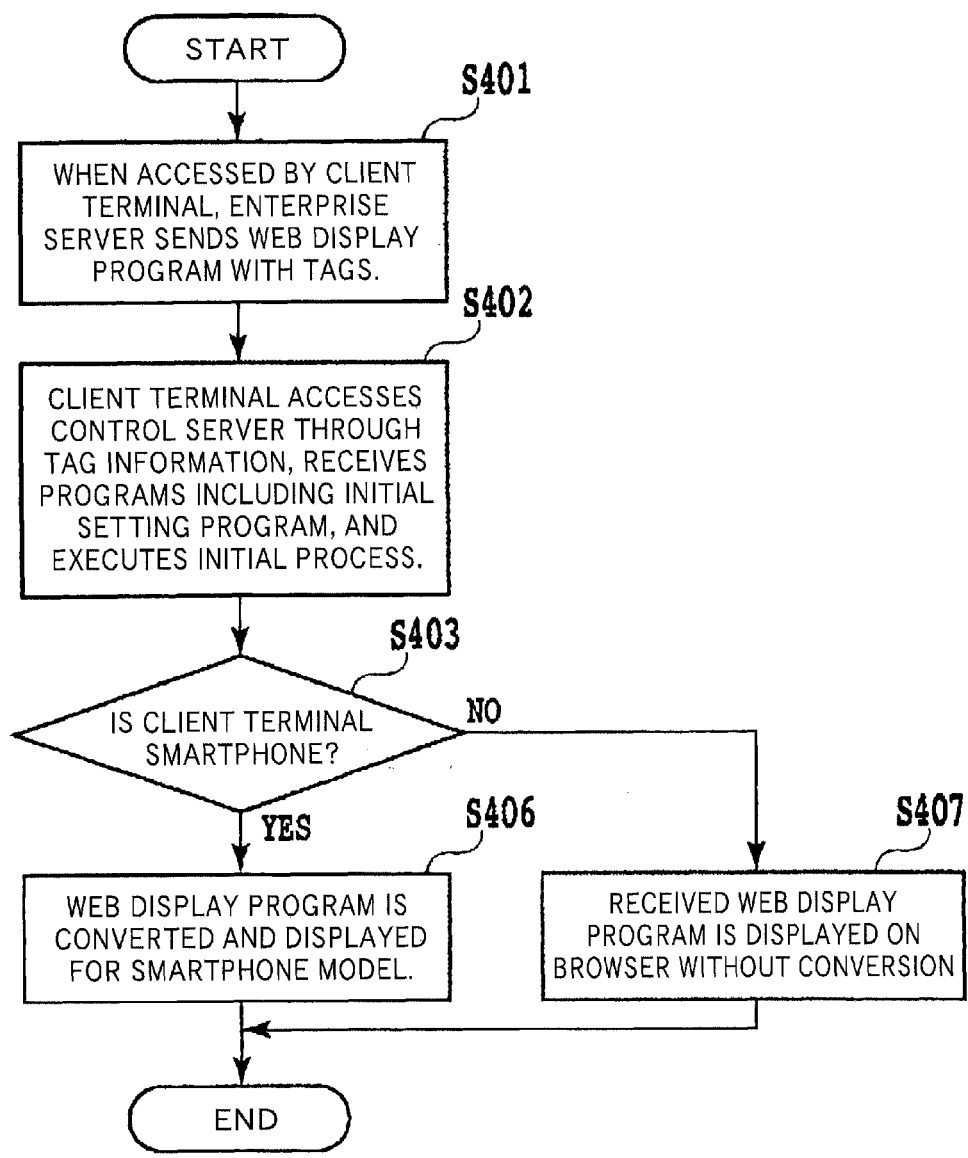
FIG. 4 is a flowchart illustrating a program conversion process according to the first embodiment.
Figure 5:
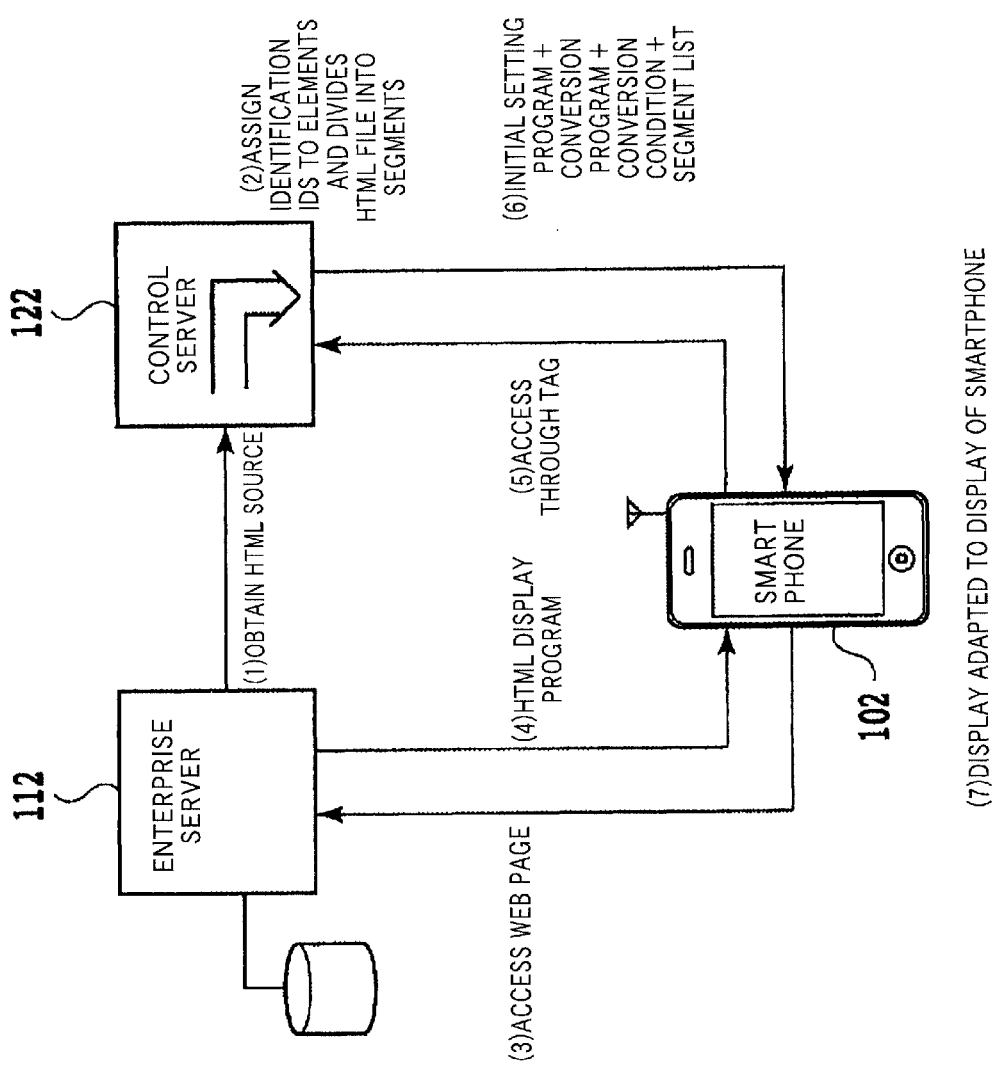
FIG. 5 is a diagram illustrating a flow of a process in a network system according to the first embodiment.
Figure 6:
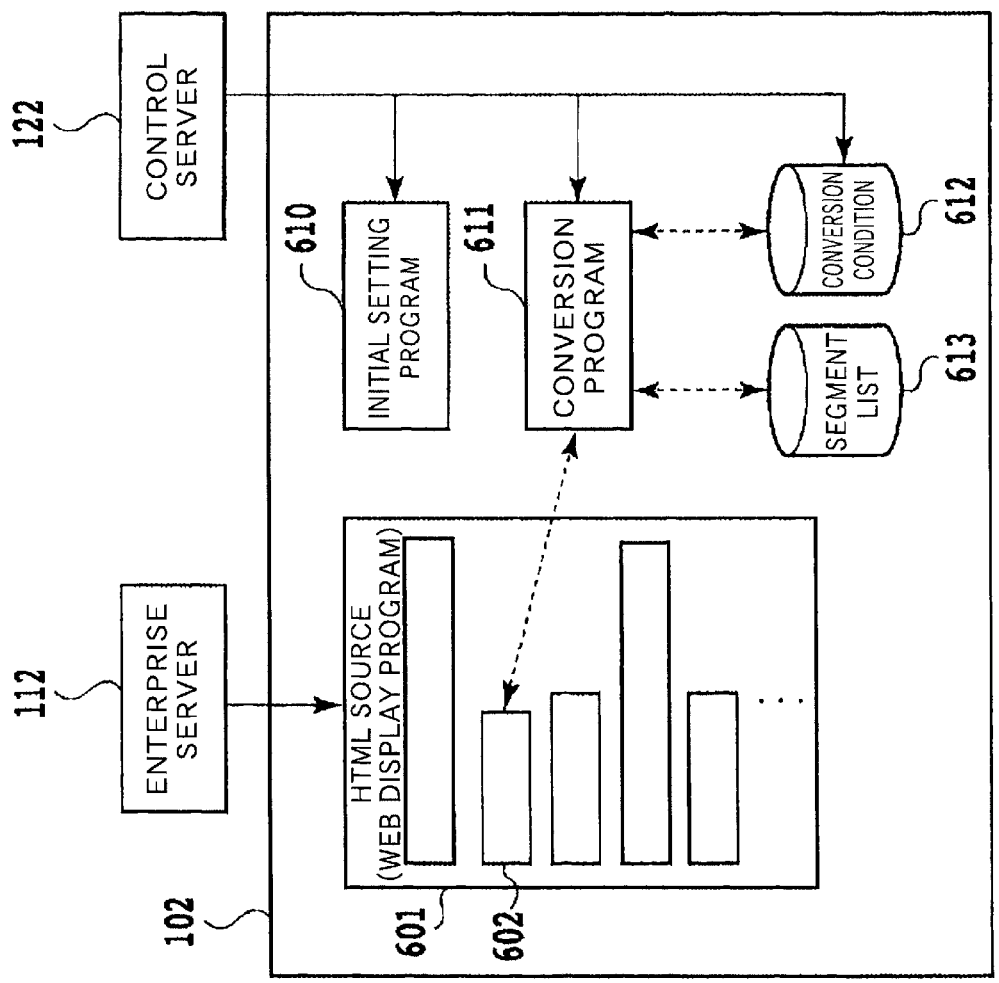
FIG. 6 is a diagram illustrating a principle of program conversion according to the first embodiment.

FIG. 4 is a flowchart illustrating a flow of the conversion process according to this embodiment. FIG. 5 is a block diagram illustrating a flow of a process according to this embodiment. FIG. 6 is a block diagram illustrating a process executed by the smartphone 102.

The control server 122 obtains an HTML source of a Web display program from the enterprise server 112 (see (1) of FIG. 5). The control server 112 then generates a conversion condition 612 and a segment list 613 as described above (see (2) of FIG. 5). The conversion condition 612 and the segment list 613 are stored on the control server 112 together with a conversion program 611 and an initial setting program (which will be described later).

The smartphone 102 accesses the enterprise server 112 to request desired information from the enterprise server 112 (see (3) of FIG. 5). The enterprise server 112 sends an HTML file corresponding to the requested information to the smartphone 102 (see step S401 of FIG. 4 and (4) of FIG. 5). A web browser on the smartphone 102 interprets the HTML file received. As has been described above, a tag for causing a communication terminal such as the smartphone 102 to access the control server 112 is set in the HTML file. The smartphone 102 accesses the control server 112 through the tag (see (5) of FIG. 5). The smartphone 102 then downloads program files, including the initial setting program 610, the conversion program 611, the conversion condition 612 and the segment list 613 from the control server 12 (see (6) of FIG. 5) and uses the initial setting program to execute an initial process (see step S402). In the initial process, the type of the communication terminal (that is, the client terminal) is identified (see step S403). If the communication terminal is not a smartphone (for example if the communication terminal is a PC), the conversion process of this embodiment is not executed but the HTML file received at step S401 described above is displayed on the Web browser without being converted (step S407).

On the other hand, if it is determined at step S403 that the communication terminal is a smartphone, the smartphone 102 executes the conversion program 611 (see step S406). As has been described above, the conversion program 611 uses the conversion condition 612 and the segment list 613 to execute the conversion process for converting the HTML file received at step S401. As has been described above, the conversion process converts, on the basis of the conversion condition 612, a part of the HTML source 601 contained in the Web display program that corresponds to the segment 602 identified on the segment list 613. The smartphone 102 then displays the converted Web display program (see (7) of FIG. 5).

At step 403 described above, it is determined only whether the communication terminal is a smartphone or not. However, if the communication terminal is a smartphone, a further determination may be made to identify the model of the smartphone.

At step S402 described above, the initial setting program 610, the conversion program 611, the conversion condition 612 and the segment list 613 are downloaded at a time. However, only the initial setting program 610 may be downloaded at step S402 and, if it is determined at step S403 that the communication terminal is a smartphone, then the conversion program 611, the conversion condition 612 and the segment list 613 may be downloaded and a process at step 406 may be executed.

Figure 8:
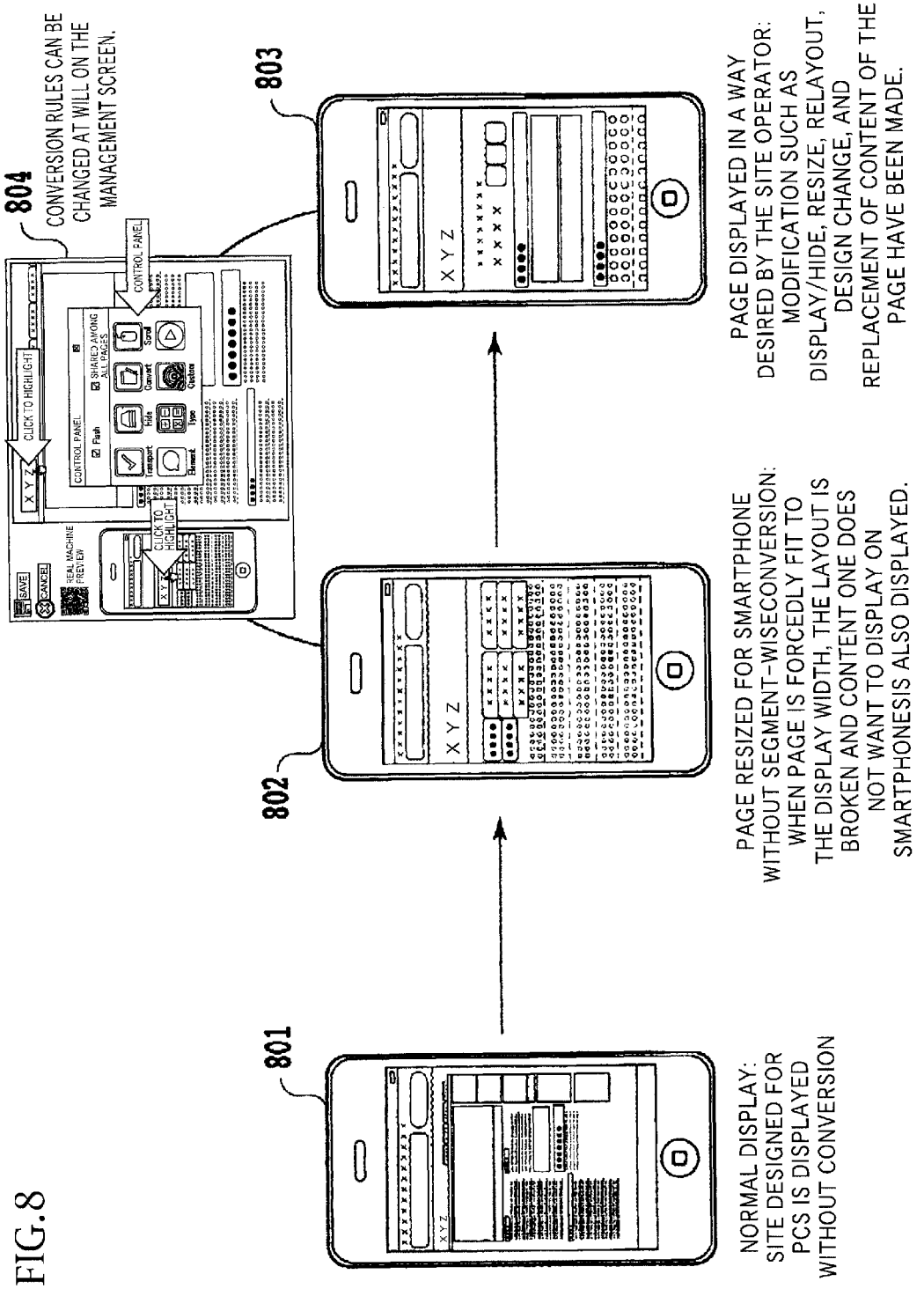
FIG. 8 is a diagram illustrating an example how the system according to the first embodiment improves display.

FIG. 8 is a conceptual diagram illustrating a Web display converted by the conversion system according to this embodiment. As illustrated in FIG. 8, when a page designed for PCs 104 is simply reduced in size without conversion and displayed on the smartphone 102 (see a sample display 801), characters and images appear too small to view comfortably. When individual components are enlarged to a viewable size, characters and images become easily viewable but the layout of the display is broken so that the overall configuration of the page cannot be seen (see a sample display 802). In contrast, when the conversion process of this embodiment is performed, a Web display that is comfortably viewable can be provided because the conversion process allows setting display/hide, resizing, relayout, design change and replacement of display elements on a segment-by-segment basis (see a sample display 803) by using a conversion condition setting tool 804, which will be described later.

As has been described above, if the communication terminal is a smartphone, a further determination can be made to identify the model of the smartphone. If the model of the smartphone is identified, a process specified for each model may be executed after the conversion process described above. This can provide a Web site that is easier to use.

(Process for Setting Conversion Condition)

A program executing a process in this embodiment, that is, a process for converting an HTML file by using a segment list and a conversion condition, that is, a conversion condition setting tool 1000, will be described with reference to FIGS. 9 and 10.

Figure 10:
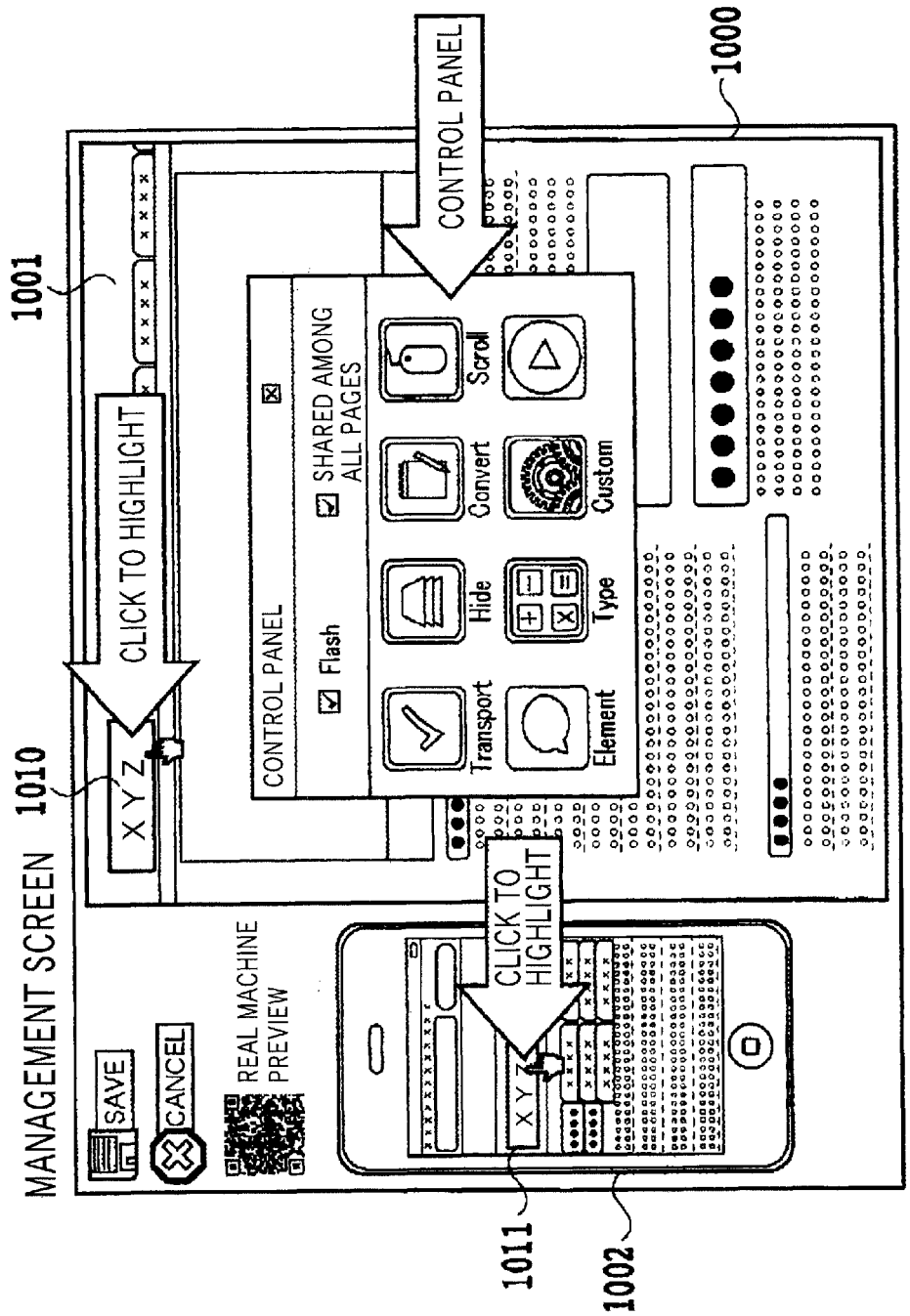
FIG. 10 is a diagram illustrating an example of a display screen of a process for setting a conversion condition according to the first embodiment.

According to this embodiment, a Web site provider or a program developer uses the conversion condition setting tool 100 illustrated in FIG. 10 to perform a Web display program conversion process and sends the converted Web display program to the control server 122.

The Web page provider or the program developer accesses the conversion condition setting tool 1000 stored in the program maintenance unit 203 (see FIG. 2) of the control server 122 from the Web page provider's or the program developer's PC.

Figure 9:
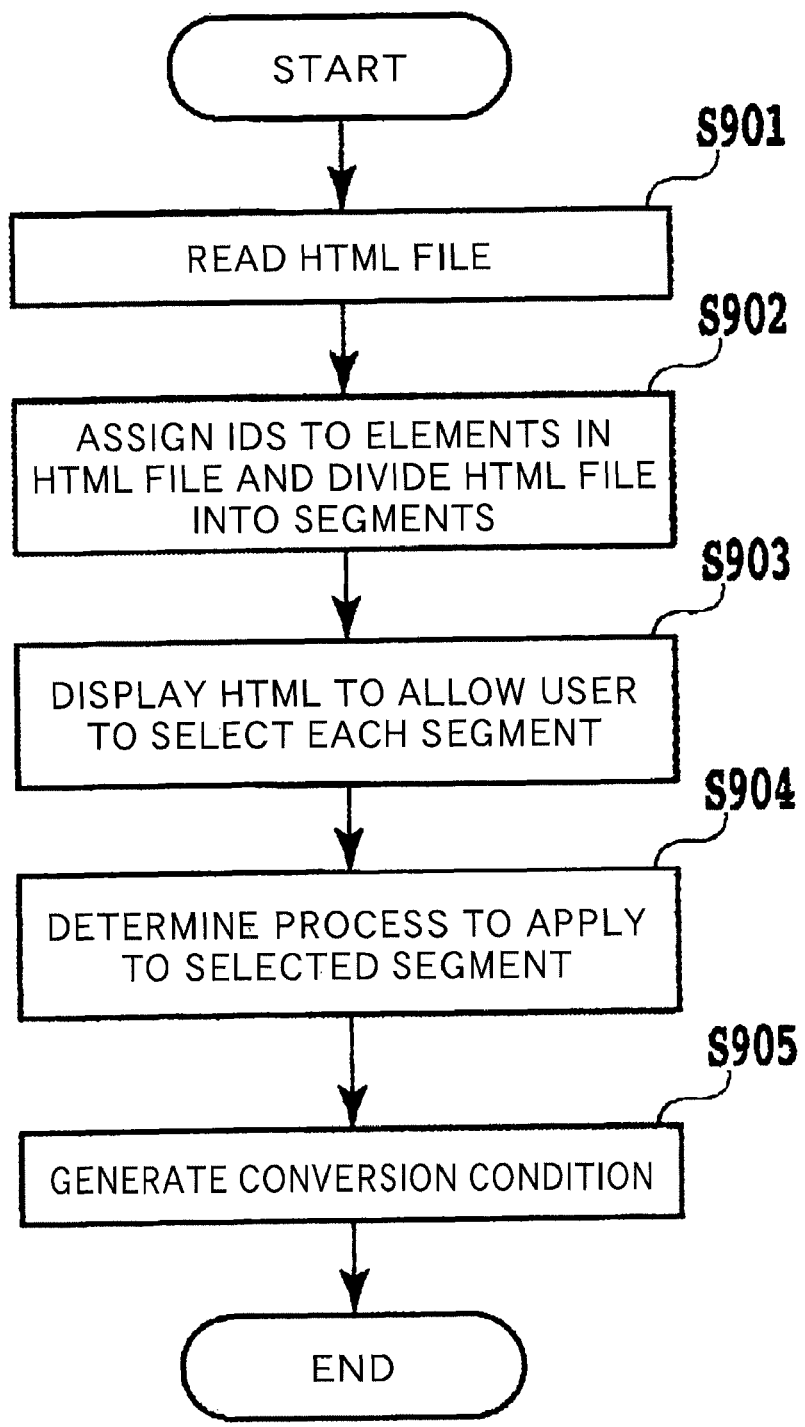
FIG. 9 is a flowchart illustrating an example of a process for setting a conversion condition according to the first embodiment.

The conversion condition setting tool 1000 first reads an HTML file for PCs 104 (see S901 of FIG. 9).

The conversion condition setting tool 1000 then executes the process for dividing the HTML file into segments and the process for assigning identification information to tags to generate a segment list, as described above (see step S902).

The conversion condition setting tool 1000 then displays the HTML file's display screen 1001 for PCs 104 and the HTML file's display screen 1002 for smartphones 102 at a time. In addition, a control panel illustrated in FIG. 10 is displayed on the display screen 1001 for PCs 104.

In this state, the web site provider or the program developer clicks on any segment 1010 on the display screen 1001 for PCs 104. The clicked segment 1010 is highlighted and, at the same time, the segment 1011 among the segments of the display screen 1002 for smartphones 102 that corresponds to the segment 1010 is also highlighted.

The web site provider or the program developer uses the control panel to choose a conversion process to apply to the segment 1010 (see step S904). The conversion condition setting tool 1000 executes the conversion file generation process described above. As a result, a segment list and a conversion condition in which the result of the conversion process is reflected are regenerated. The conversion condition setting tool 1000 converts the HTML file according to the result of the conversion process to modify the display screen 1002 for smartphones 102. On the resulting screen, the Web site provider or program developer can check the result of the conversion process.

If the result of the conversion process is satisfactory, the Web site provider or the program developer follows the same procedure to perform the conversion process on another segment. In this way, the final conversion condition file is generated.

Although not detailed herein, the conversion condition file may be in any format that can implement the present invention and may be stored in any form. The conversion condition file may be included in the conversion program described above.

As has been described above, according to this embodiment, a Web display program designed for PCs 104 can be converted to a Web display program for smartphones 102 by a simple process. Furthermore, when the Web display program designed for PCs 104 have been updated, the Web page for smartphones 102 can be updated without having to change the segment list or the conversion condition or, if needed, the segment list and the conversion condition can be changed very easily.

Furthermore, according to this embodiment, a WWW server or the like does not need to be operated specifically for smartphones because the conversion process is executed by the smartphone 102.

Second Embodiment of the Invention

In a system of a second embodiment, a conversion condition 612 and a segment list 613 are provided from an enterprise sever to a smartphone. That is, the enterprise server of this embodiment acts as both the "conversion information server" and the "display information server" of the present invention.

Figure 12:
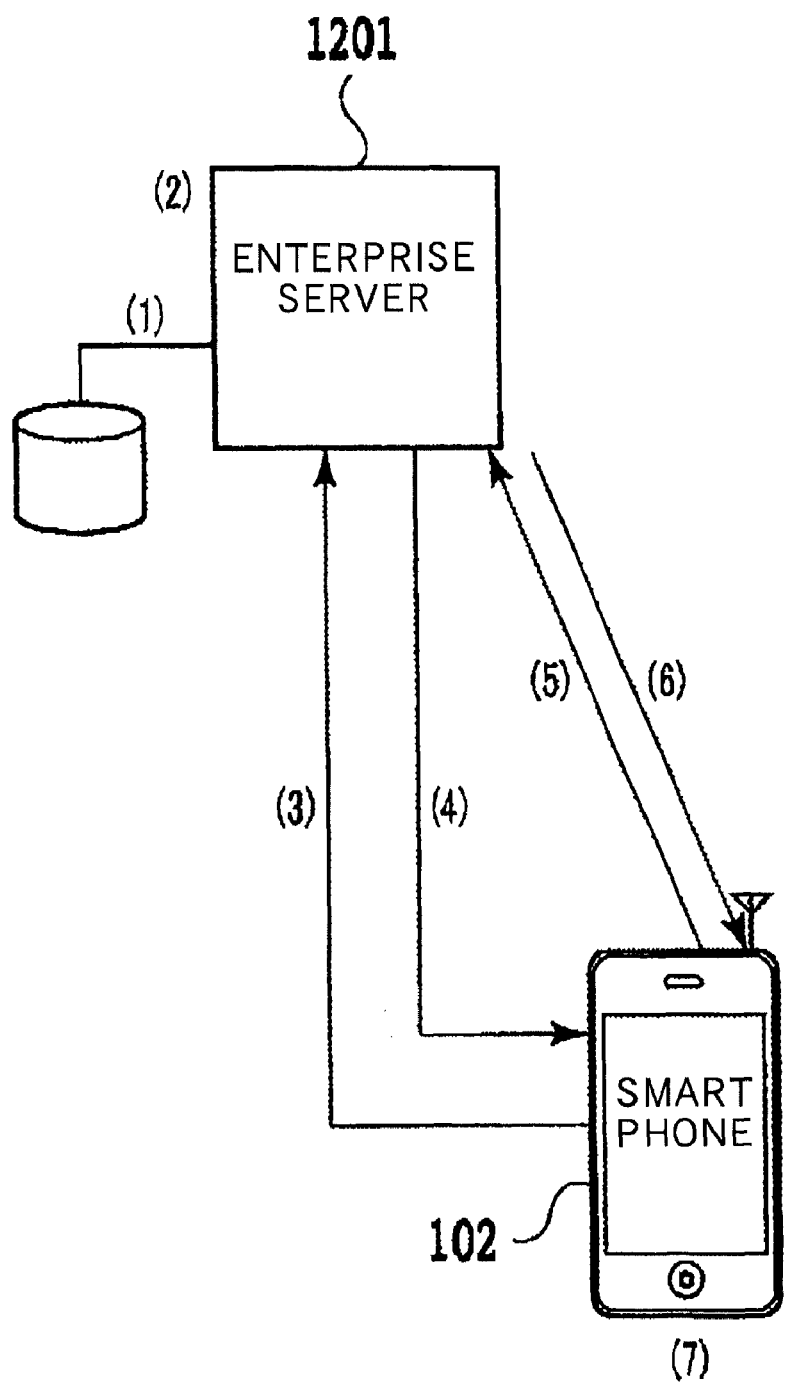
FIG. 12 is a block diagram illustrating a flow of a process according to a second embodiment.

FIG. 12 is a block diagram illustrating a flow of a process according to this embodiment.

The enterprise server 1201 reads an HTML source of a Web display program stored in an internal database 1202 (see (1) of FIG. 12). The enterprise server 1201 then generates a conversion condition 612 and a segment list 613 in the same way as the control server 112 of the first embodiment (see (2) of FIG. 12). The conversion condition 612 and the segment list 613 are stored in a storage in the enterprise server 1201 together with an initial setting program 610 and a conversion program 611.

The smartphone 102 accesses the enterprise server 1201 to request desired information from the enterprise server 1201 (see (3) of FIG. 12). The enterprise server 112 sends an HTML file corresponding to the requested information to the smartphone 102 (see (4) of FIG. 12). A Web browser on the smartphone 102 interprets the HTML file received. A tag that causes a communication terminal such as the smartphone 102 to access the enterprise server 1201 has been set in the HTML file. Based on the tag, the smartphone 102 accesses the enterprise server 1201 again (see (5) of FIG. 12). The smartphone 102 then downloads program files, including the initial setting program 610, the conversion program 611, the conversion condition 612, and the segment list 613, from the enterprise server 1201 (see (6) of FIG. 12) and uses the initial setting program to execute an initial process. In the initial process, the type of the communication terminal (that is, the client terminal) is identified. If the communication terminal is not a smartphone (for example if the communication terminal is a PC), the conversion process of this embodiment is not executed and the received HTML file is displayed through the Web browser without being converted.

On the other hand, if it is determined that the communication terminal is a smartphone, the smartphone 102 executes the conversion program 611. As in the first embodiment, the conversion program 611 uses the conversion condition 612 and the segment list 613 to execute the conversion process for converting the received HTML file. The conversion process converts, on the basis of the conversion condition 612, a part of the HTML source 601 contained in the Web display program that corresponds to the segment 602 identified on the segment list 613. Then the smartphone 102 displays the converted Web display program (see (7) of FIG. 12).

Other functions and operations are the same as those in the first embodiment and therefore description of those functions and operations will be omitted.

This embodiment is useful when it is difficult to use a control server, which is a third party's server, for reasons of the security policy of the Web site provider, for example.

Third Embodiment of the Invention

In a system of a third embodiment, a Web display program for smartphones is provided from a control server to a smartphone.

Figure 13:
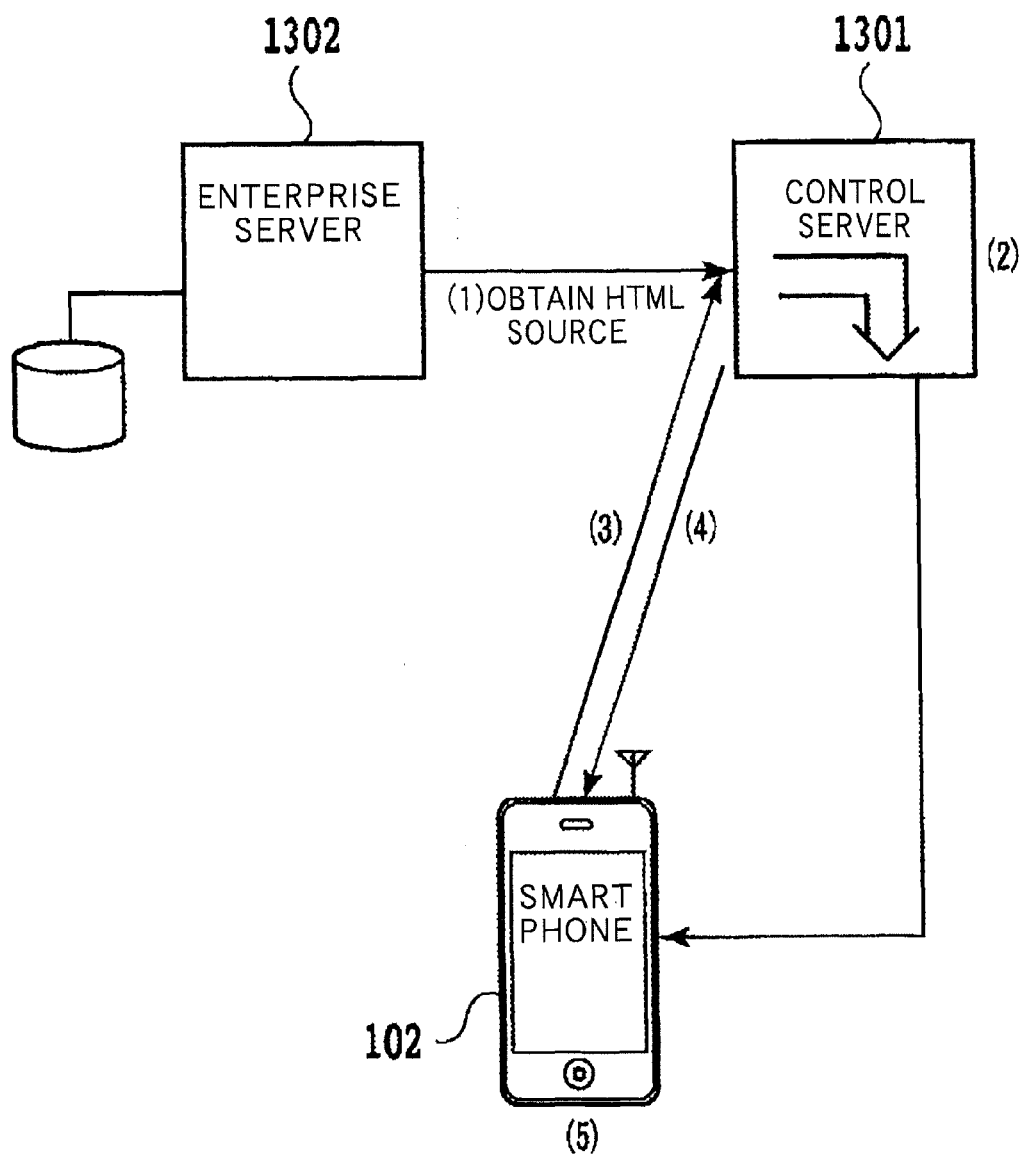
FIG. 13 is a block diagram illustrating a flow of a process according to a third embodiment.

FIG. 13 is a block diagram illustrating a flow of a process according to this embodiment.

The control server 1301 obtains an HTML source of a Web display program from an enterprise server 1302 (see (1) of FIG. 13). The control server 1301 then generates a conversion condition 612 and a segment list 613 as described above (see (2) of FIG. 13). The conversion condition 612 and the segment list 613 are stored on the control server 1301 together with an initial setting program 610 and a conversion program 611.

A smartphone 102 accesses the control server 1301 to request desired information from the control server 1301 (see (3) of FIG. 13). The control server 1301 sends program files, including the conversion program 611, the conversion condition 612 and the segment list 613, to the smartphone 102 together with an HTML file corresponding to the requested information (see (4) of FIG. 13). The smartphone 102 executes the conversion program 611. As in the first embodiment, the conversion program 611 uses the conversion condition 612 and the segment list 613 to execute a conversion process for converting the received HTML file. The conversion process converts, on the basis of the conversion condition 612, a part of the HTML source 601 contained in the Web display program that corresponds to the segment 602 identified on the segment list 613. Then smartphone 102 displays the converted Web display program (see (5) of FIG. 13).

In this way, the control server 1301 of this embodiment provides the conversion program 611 and other data to the smartphone 102 together with the Web display program. Accordingly, a tag for causing the smartphone 102 to access the control server 1301 does no need to be set in the HTML source.

The other functions and operations are the same as those in the first embodiment and therefore description of those functions and operations will be omitted.

This embodiment is useful for example when the manufacturer of smartphones 102 provides a Web site browsing service to their smartphones 102.

The invention claimed is:

1. A Web display program conversion system comprising a conversion information server apparatus connected to a communication network, wherein the conversion information server apparatus comprises:
   a central processing unit (CPU);
   a first storage which stores a segment list created by dividing a first Web display program created for causing a first communication terminal apparatus to present a Web display into a plurality of segments, assigning identification information to each of tags contained in each of the segments, and listing the identification information;
   a second storage which stores a conversion condition created for each of the segments for changing a display setting described in the first Web display program to a display setting of a second Web display program for causing a second communication terminal apparatus to present a Web display;
   a third storage which stores a conversion program for causing the second communication terminal apparatus to execute a process for converting the first Web display program to the second Web display program by using the segment list and the conversion condition; and
   a transmitting unit which sends the segment list, the conversion condition, and the conversion program to the communication network,
   wherein a fourth storage stores an initial setting program to be executed on any of the first and second communication terminal apparatuses, the initial setting program is a program that determines whether a communication terminal apparatus is the first communication terminal apparatus or the second communication terminal apparatus and, only if the communication terminal apparatus is the second communication terminal apparatus, causes the conversion process to be executed.

2. The Web display program conversion system according to claim 1, wherein:
   the Web display program conversion system further comprises a display information server apparatus connected to the communication network, and
   the display information server apparatus stores the first Web display program and sends the first Web display program in response to a request from any of the first and second communication terminal apparatuses.

3. The Web display program conversion system according to claim 2, wherein the first Web display program sent from the information transmitting unit of the display information server apparatus includes a tag for causing any of the first and second communication terminal apparatuses to access the conversion information server apparatus to obtain the initial setting program.

4. The Web display program conversion system according to claim 2, wherein the initial setting program is sent from the transmitting unit to any of the first and second communication terminal apparatuses together with the segment list, the conversion condition, and the conversion program.

5. The Web display program conversion system according to claim 2, wherein the segment list, the conversion condition and the conversion program are sent from the transmitting unit to the second communication terminal apparatus only if the initial setting program determines that the communication terminal apparatus is the second communication terminal apparatus.

6. The Web display program conversion system according to claim 2, wherein the conversion information server apparatus stores the first Web display program and, in response to a request from any of the first and second communication terminal apparatuses, sends the first Web display program.

7. The Web display program conversion system according to claim claim 1, wherein the first Web display program sent from the transmitting unit of the conversion information server apparatus includes a tag for causing any of the first and second communication terminal apparatuses to access the conversion information server apparatus again to obtain the initial setting program.

8. The Web display program conversion system according to claim 1, wherein the initial setting program is sent from the transmitting unit to any of the first and second communication terminal apparatuses together with the segment list, the conversion condition, and the conversion program.

9. The Web display program conversion system according to claim 1, wherein the segment list, the conversion condition and the conversion program are sent from the display information server apparatus to the second communication terminal apparatus only if the initial setting program determines that the communication terminal apparatus is the second communication terminal apparatus.

10. The Web display program conversion system according to claim 1, wherein the conversion information server apparatus stores the first Web display program and, in response to a request from the second communication terminal apparatuses of a predetermined type, sends the first Web display program.

11. A Web display program conversion method comprising:
  creating a segment list by dividing a first Web display program created for causing a first communication terminal apparatus to present a Web display into a plurality of segments, assigning identification information to each of tags contained in each of the segments, and listing the identification information;
  creating, for each of the segments, a conversion condition for changing a display setting described in the first Web display program to a display setting of a second Web display program for causing a second communication terminal apparatus to present a Web display; and
  causing the second communication terminal apparatus to execute a process for converting the first Web display program to the second Web display program by using the segment list and the conversion condition,
  wherein an initial setting program is caused to be executed on any of the first and second communication terminal apparatuses and the initial setting program is a program that determines whether a communication terminal apparatus is the first communication terminal apparatus or the second communication terminal apparatus and, only if the communication terminal apparatus is the second communication terminal apparatus, causes the converting process to be executed.

12. A non-transitory computer-readable storage medium having recorded thereon a computer program for causing a computer to execute:
  creating a segment list by dividing a first Web display program created for causing a first communication terminal apparatus to present a Web display into a plurality of segments, assigning identification information to each of tags contained in each of the segments, and listing the identification information;
  creating, for each of the segments, a conversion condition for changing a display setting described in the first Web display program to a display setting of a second Web display program for causing a second communication terminal apparatus to present a Web display; and
  causing the second communication terminal apparatus to execute a process for converting the first Web display program to the second Web display program by using the segment list and the conversion condition,
  wherein an initial setting program is caused to be executed on any of the first and second communication terminal apparatuses and the initial setting program is a program that determines whether a communication terminal apparatus is the first communication terminal apparatus or the second communication terminal apparatus and, only if the communication terminal apparatus is the second communication terminal apparatus, causes the converting process to be executed.

* * * * *

UNITED STATES PATENT AND TRADEMARK OFFICE
CERTIFICATE OF CORRECTION

PATENT NO. : 8,291,311 B2  Page 1 of 1
APPLICATION NO. : 13/381038
DATED : October 16, 2012
INVENTOR(S) : Toyoshi Nagata It is certified that error appears in the above-identified patent and that said Letters Patent is hereby corrected as shown below:

Column 15, Line 4, In Claim 7, delete "claim claim" and insert -- claim --, therefor.

Signed and Sealed this
First Day of January, 2013

David J. Kappos
*Director of the United States Patent and Trademark Office*